(12) United States Patent
Watanabe et al.

(10) Patent No.: US 6,386,511 B1
(45) Date of Patent: May 14, 2002

(54) GATE VALVE APPARATUS

(75) Inventors: Kazuhito Watanabe, Tama; Yoshihiro Katsumata, Fujiyoshida; Nobuyuki Takahashi, Sagamihara, all of (JP)

(73) Assignee: Anelva Corporation (JP)

( * ) Notice: Subject to any disclaimer, the term of this patent is extended or adjusted under 35 U.S.C. 154(b) by 0 days.

(21) Appl. No.: 09/654,117

(22) Filed: Sep. 1, 2000

(30) Foreign Application Priority Data

Sep. 8, 1999 (JP) ............................................ 11-254570

(51) Int. Cl.[7] ............................. F16K 1/16; F16K 31/44
(52) U.S. Cl. ........................ 251/301; 251/251; 251/279
(58) Field of Search ............................... 257/203, 251, 257/257, 279, 301

(56) References Cited

U.S. PATENT DOCUMENTS

| | | | |
|---|---|---|---|
| 1,951,485 A | * 3/1934 | Loepsinger | |
| 3,249,117 A | * 5/1966 | Edwarde | |
| 3,788,346 A | * 1/1974 | Fitzgerald | 137/330 |
| 4,058,199 A | * 11/1977 | Schlagel | 198/370 |
| 5,310,410 A | * 5/1994 | Begin et al. | 29/25.01 |
| 5,769,952 A | * 6/1998 | Komino | 118/733 |
| 5,899,438 A | * 5/1999 | Gunder | 251/229 |
| 6,089,537 A | * 7/2000 | Olmsted | 251/129.11 |

* cited by examiner

Primary Examiner—Philippe Derakshani
Assistant Examiner—David A Bonderer
(74) Attorney, Agent, or Firm—Venable; James R. Burdett (57) ABSTRACT

To be able to reduce the size of a drive part and, as a result, to achieve the reduction in size and the lowering of manufacturing cots of a gate valve. An open/close mechanism is configured from a turning pair only. This open/close mechanism is configured from a first swing link, second swing link and coupling link. The first swing link is driven by a rotation cylinder to perform a swinging motion. The second swing link is connected to a drive shaft and performs a swinging motion with the drive shaft as its axis. The first swing link and second swing link are coupled by the coupling link. When the rotation cylinder is driven, whereby the first swing link is caused to swing, the coupling link is vertically driven whereby the second swing link is caused to swing. As a result, a valve, connected to the second swing link, swings and the opening and closing operation of the flow path port is performed.

8 Claims, 8 Drawing Sheets

PRIOR ART

FIG.7

PRIOR ART

FIG.8

PRIOR ART

GATE VALVE APPARATUS

BACKGROUND OF THE INVENTION

1. Field of the Invention

The present invention relates to a gate valve apparatus for a vacuum-processing device.

2. Description of Related Art

Generally in gate valves the valve rod connected to the valve is driven by a link mechanism whereby the open/close operation of the flow path port is performed. In conventional gate valves, when the flow path port is to be closed, the valve is acted upon directly to move along the direction in which the valve rod extends. As a result, the valve is moved to a position that opposes the valve seat. Thereafter, the valve is push pressured to the valve seat. In this way, a conventional gate valve comprises a direct-acting link mechanism for the purpose of moving the valve in the direction in which the valve rod extends.

Figure 6:
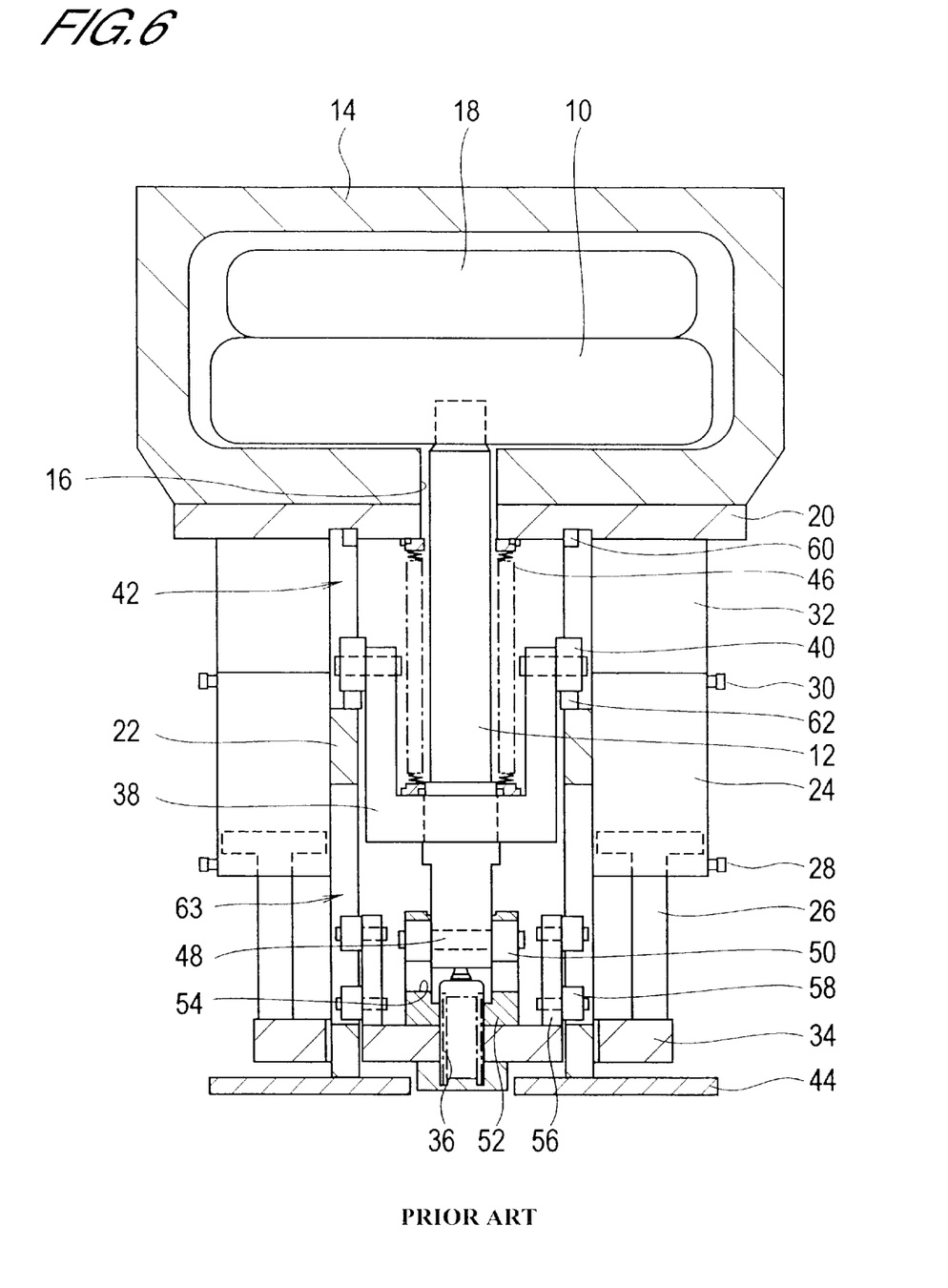
FIG. 6 is a cross-sectional diagram for showing the configuration of a conventional gate valve apparatus.
Figure 7:
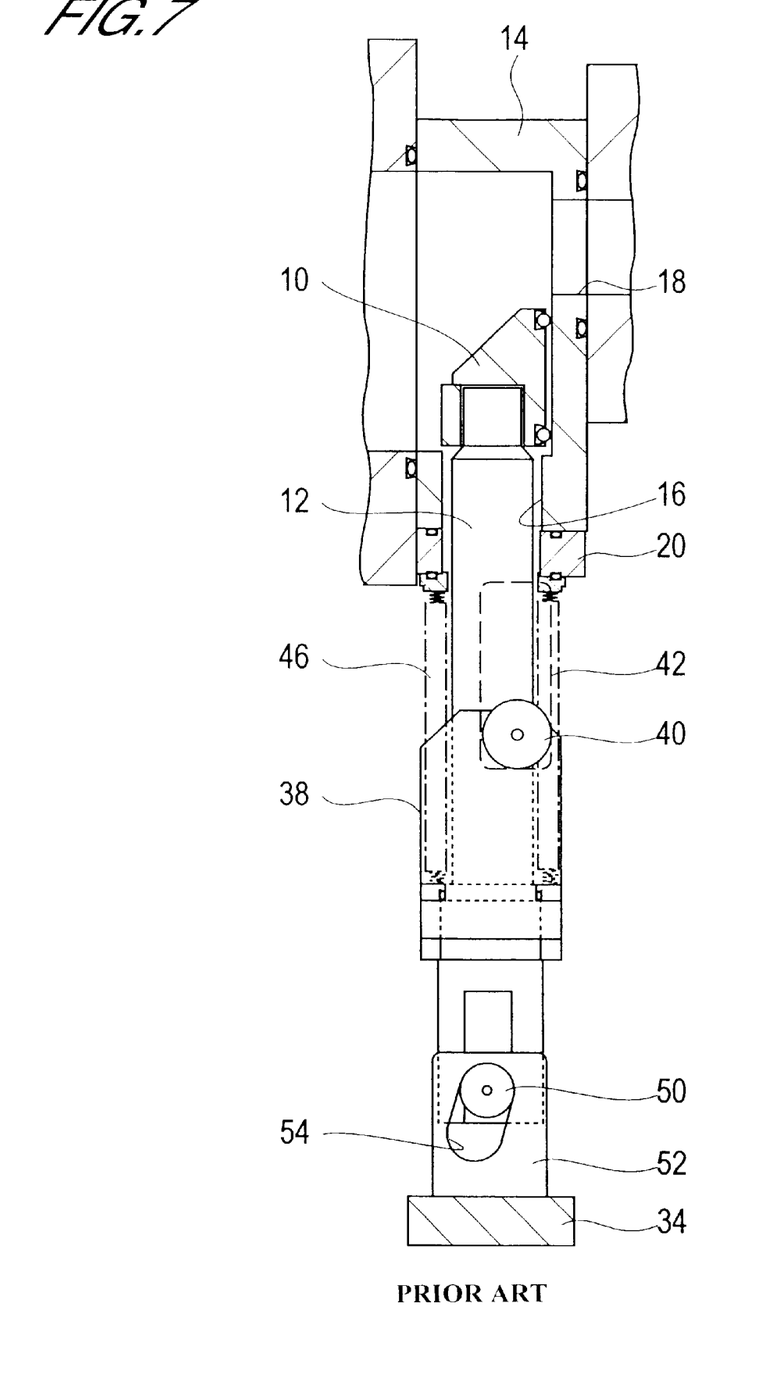
FIG. 7 is another cross-sectional diagram for showing the configuration of the conventional gate valve apparatus.
Figure 8:
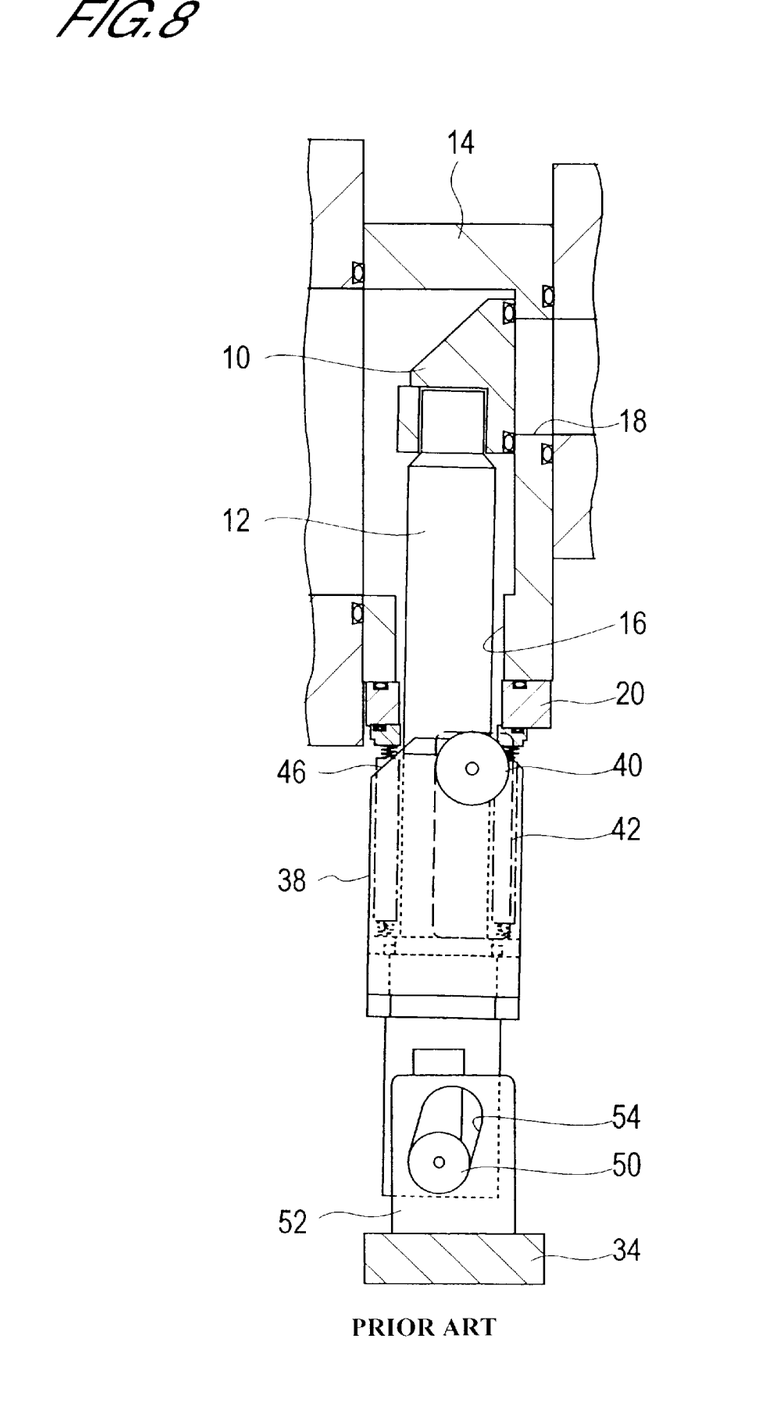
FIG. 8 is still another cross-sectional diagram for showing the configuration of the conventional gate valve apparatus.

FIG. 6, FIG. 7 and FIG. 8 show the cross-sections of a conventional gate valve configuration. FIG. 6 is a diagram which shows the cross-section parallel to the valve seat of the gate valve. FIG. 7 and FIG. 8 are diagrams which show the cross-section orthogonal to the valve seat of the gate valve. FIG. 6 and FIG. 7 show the state when it is opened and FIG. 8 shows the state when it is closed.

As shown in FIG. 6, FIG. 7 and FIG. 8, the valve 10 is housed in the inner part of the valve box 14. The valve box 14 is provided on a fitted or fixing plate 20. One end of a drive shaft 12, as a valve rod, is connected to the valve 10. The other end of the drive shaft 12, by way of an opening 16 formed in the lower part of the valve box 14, leads out to the exterior of the valve box 14. The drive shaft 12 extends in a direction parallel to the valve seat of the circumferential edge of a flow path port 18 which opens to a side part of the valve box 14. A link mechanism for driving the drive shaft 12 is provided below the fitted plate 20. Using this link mechanism, the drive shaft 12 is operated whereby, by the movement of the valve 10 interlocked therewith, opening and closing of the flow path port 18 is performed. The valve 10, when closed, is in a state in which it is seated on the valve seat.

Next, a description of the configuration of the link mechanism will be given. Two mutually parallel plates 22 connect between the fitted plate 20 and a base plate 44. These plates 22 are provided in a state in which they are parallel with the direction in which the drive shaft 12 extends. The position in which the drive shaft 12 is deployed is between these plates 22.

Direct-acting cylinders 24 are provided on one end side of the plates 22, respectively, and the drive shaft 12 is provided on the other end side of the plates 22, respectively. The direct-acting cylinders 24 are fitted or fixed to the lower surface of each of the fitted plates 20 by way of cylinder-fitting blocks 32 of the same thickness.

Shafts 26, to which is attached a flange, are housed in the inner part of the above-noted direct-acting cylinders 24 in such a way as to be able to slide in the same direction as the direction in which the drive shaft 12 extends. The direct-acting cylinders 24 comprise two air ports. When air is introduced into the lower-end side air port 28 the shaft 26 rises. When air is introduced to the upper-end side air port 30 the shaft 26 lowers.

Power transmission plates 34 are connected to the lower end of the shafts 26 in a parallel state to the fitted plate 20. These power transmission plates 34, accompanying the rise/lower movement of the shafts 26, can be raised and lowered along the plates 22. Spring parts 36 are provided in the center of the power transmission plates 34. The lower end of the drive shaft 12 is supported on the power transmission plates 34 by way of the spring parts 36.

A shaft guide 38 is attached to a predetermined position in the center region of the drive shaft 12. Two pulleys 40 are provided in the shaft guide 38. These pulleys 40 are supported on the same axis. These pulleys 40 perform a rolling movement along long-holes 42 formed in the plates 22. Accordingly, the drive shaft 12 is able to have straight movement along the long-holes 42 together with the shaft guide 38. In addition, the drive shaft 12 and shaft guide 38 can perform rotation movement with the pulleys 40 forming the axis. Stoppers 60 and 62 are respectively provided in the fitted or fixing plate 20 side and direct-acting cylinder 24 side of the long-holes 42 and, as a result, the range of straight movement of the drive shaft 12 and shaft guide 38 is regulated.

The shaft guide 38 and the fitted plate 20 are coupled by a bellows 46. The drive shaft 12 is deployed in a state in which it is inserted in the bellows 46. A section of the opening 16 of the valve box 14 is sealed by the bellows 46 so the pressure state within the valve box 14 is maintained.

Power introducing plates 52, which comprise mutually parallel and opposing plates, are fixed to the power transmission plates 34. The lower end of the drive shaft 12 is enclosed in a state in which it has freedom to swing between the plates of the power introducing plates 52. In addition, through-holes which extend in a direction parallel to the axis of the above-noted pulleys 40 are formed in the lower end of the drive shaft 12, and a cam shaft 48 is inserted into these holes. Cylinder-shaped cams 50 are formed in both ends of this cam shaft 48, respectively. These cams 50 are fitted into holes 54 formed in the plates of the power introducing plate 52. The cams 50 can be rolled along the holes 54. The shape of the holes 54 is formed in such a way that the roll direction of the cams 50 is a state in which it is slightly inclined from the direction in which the drive shaft 12 extends, at the time of opening, to the flow path port 18 side.

Furthermore, power introducing plate guides 56 are arranged on the both sides of power introducing plates 52, respectively, and are apart therefrom, respectively. These power introducing plate guides 56 are fixed to the power transmission plates 34. Two pulleys 58 are supported by these power introducing plate guides 56, and these pulleys 58 can perform a rolling movement along a long hole 63 formed in the plates 22. These power introducing plate guides 56 are provided with the objective of reducing the twist and slur during the operation of the drive shaft 12.

Next, a description of the closing operation of the above-described gate valve will be given. First, with the gate valve being in the state as shown in FIG. 6 and FIG. 7, air is introduced into the air ports 28 of the direct-acting cylinders 24. When this is done, the shafts 26 begin to rise in the vertical direction, and the power transmission plates 34 and power introducing plates 52 interlocked therewith start to rise. The power transmission plates 34 push up the lower end of the drive shaft 12 by way of the spring parts 36. At this time, the cams 50 are positioned in the upper end side of the holes 54 of the power introducing plates 52. According to the rise of the drive shaft 12, the shaft guide 38 moves along the plates 22 and the bellows 46 contract. Finally, the pulleys 40 of the shaft guide 38 contact the stopper 60 provided in the fitted plate 20 and the rising movement of the drive shaft 12 is completed. As the result, the valve 10 is in a state in which it opposes the flow path port 18.

Next, the shafts 26, power transmission plates 34 and power introducing plates 52 rise. By virtue of this rising movement, the cams 50 roll along the holes 54 of the power introducing plates 52, and the stance of the drive shaft 12 is altered. That is to say, in order for the roll direction of the cams 50 to be inclined with respect to the rise direction of the shafts 26, the drive shaft 12 performs a rotation movement with the pulleys 40 of the shaft guide 38 as its axis. By virtue of this rotation movement, the valve 10 is push-pressured to the side of the flow path port 18. As shown in FIG. 8, as a result of the rotation movement of the drive shaft 12—in the clockwise direction of the diagrams—the valve 10 is seated on the valve seat. At this time, the cams 50 are positioned in the lower end side of the holes 54 of the power introducing plates 52.

Next, a description will be given to the opening operation of the gate valve. In the state shown in FIG. 8, air is introduced into the air port 30 of the direct-acting cylinders 24. When this is done, the shafts 26, power transmission plates 34 and power introducing plates 52 begin to lower. According to this lowering, the cams 50 roll along the holes 54 of the power introducing plates 52 and, then, as described above, the drive shaft 12 is rotated in the anti-clockwise direction in the drawing of FIG. 8. As a result, the valve 10 is separated from the valve seat. At this time, the spring parts 36 have an action whereby they ease or damp the wobble of the drive shaft 12.

Finally, the cams 50 reach the upper end side of the holes 54. At this time, the direction in which the drive shaft 12 extends coincides with the lowering direction of the shafts 26. Thereafter, by the lowering of the shafts 26, the drive shaft 12 and the shaft guide 38 are caused to lower. This lowering movement continues until the pulleys 40 of the shaft guide 38 are in contact with the stoppers 62 of the direct-acting cylinders 24.

As is described above, a conventional gate valve comprises a direct-acting link mechanism in order to move the valve in the direction in which the valve rod extends.

However, in a direct-acting link mechanism, the forces imparted to the valve 10 are determined by the distance between the stoppers 60 and a cam shaft 48 and the shape of the holes 54 of the power introducing plates 52. Because of the action of an inverse pressure on the valve when the gate valve is closed, the force resistant thereto must be imparted to the valve. For this reason, the link mechanism for driving the gate valve may necessarily become large. By way of example, the distance between the stoppers 60 and camshaft 48 must be large so that the above-noted forces are produced. If this is not done, the size of the diameter of the direct-acting cylinders 24 must be made larger.

For this reason, in a vacuum processing device in which a load room, unload room and substrate processing room are arranged in the periphery of a substrate carry room, the structure is such that the gate valve fitted to the above-described rooms juts out below the room lower part surfaces, and the substrate carry room is surrounded by the jutting-out section thereof. With such a configuration, the access space or the maintenance space necessary for regular maintenance and regular check of, for example, the exhaust unit and the drive unit for the substrate carrying arranged in the substrate-carry room lower part, cannot be secured.

Accordingly, the realization of a gate valve apparatus in which the drive unit can be reduced in size—from that of the prior art—has been desired.

An object of the invention of the present application is to provide a gate valve apparatus in which the reduction in size of the gate valve can be achieved so as to make a reduction in weight of the gate valve and a reduction in manufacturing costs of the gate valve apparatus.

SUMMARY OF THE INVENTION

According to the invention, a gate valve apparatus comprises: a valve box with a flow path port; a valve housed in the inner side of the valve box which is employed in the opening and closing of the flow path port; a valve rod connected to the valve; and an open/close mechanism which affords the operation of this valve rod in that it performs a closing operation, whereby the valve is caused to be seated on the valve seat of the valve box, and an opening operation, whereby the valve is caused to be separated from said valve seat, wherein the valve is configured so as to have a swingling motion with the valve rod as its axis, and the open/close mechanism is a link mechanism configured from only a turning pair.

In the preferable embodiment of the gate valve apparatus of the present invention, the open/close mechanism may comprise a link, as a drive joint, which performs a swinging motion.

In another preferable embodiment of the gate valve apparatus of the present invention, the open/close mechanism may further comprise: a first swing link as a drive joint for performing a swinging motion; a second swing link connected to the valve rod which performs a swinging motion with the valve rod as its axis; and a coupling link which couples the first and second swing links.

With such a construction, the opening and closing of the flow path is performed by the swinging motion of the valve with the valve rod as its axis. The open/close mechanism which operates the valve rod is configured from only a turning pair. In a link mechanism configured from only a turning pair in this way, comparatively large forces can be generated even if it is of a small scale. Accordingly, a gate valve of smaller scale than the prior art can be provided.

It will be noted that the pair refers to, of the link from which the mechanism is configured, a combination of two links next to each other. The turning pair refers to a pair which rotate only around one center axis.

Furthermore, in the gate valve of the invention, it may be preferably that the valve rod comprises a kneeshaped ("<"-shaped) bent section wherein this bent section is inserted into a rotation-correspondent bellows which couples the valve box and open/close mechanism, and the structure of this rotation-correspondent bellows is of two directly connected bellows.

Since a rotation-correspondent bellows of a configuration such as mentioned above is employed, the buckling of the bellows caused by the rotation movement of the valve rod can be prevented.

DESCRIPTION OF THE PREFERRED EMBODIMENTS

A description is given below, with reference to the diagrams of embodiments of the present invention. It will be noted that, in the figures, the arrangement relationship, shape and size are shown schematically such that the invention can be understood. In addition, the conditions, such as the numbers noted below, represent no more than examples only. Accordingly, this invention is in no way limited to embodiments described below.

Figure 1:
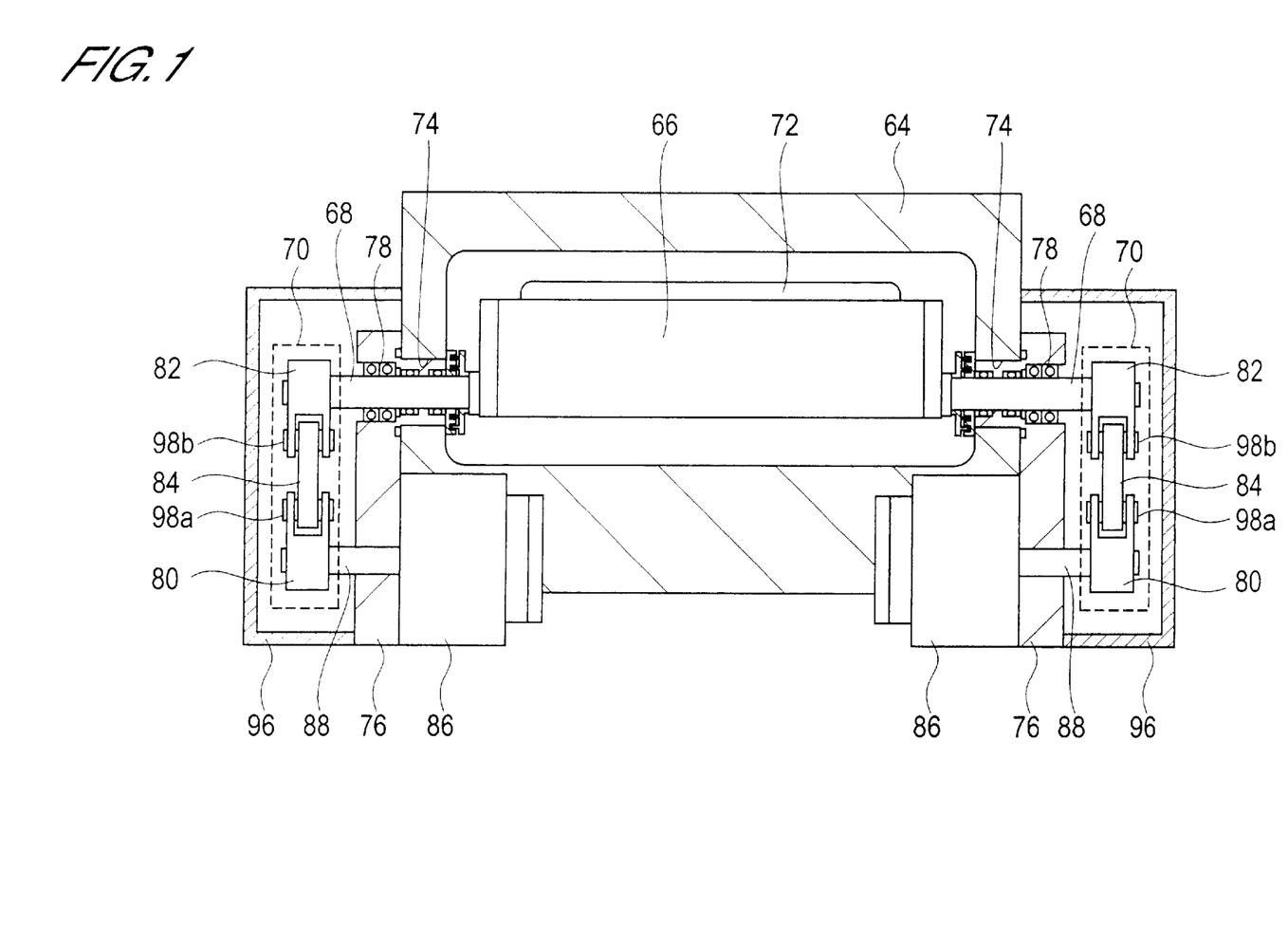
FIG. 1 is a cross-sectional diagram for showing one embodiment of the configuration of a gate valve apparatus according to the present invention.
Figure 2A:
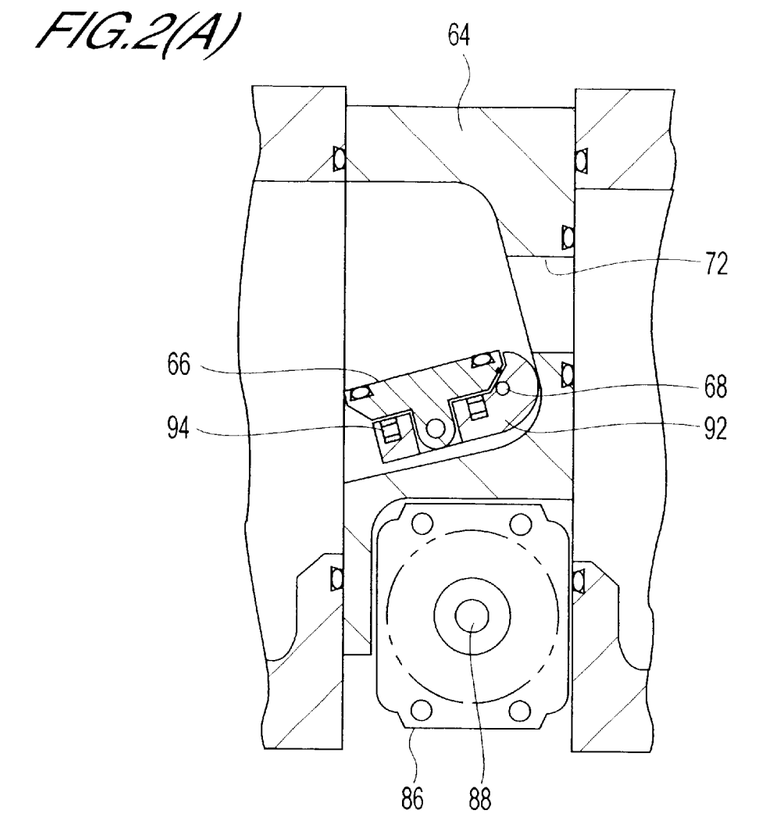
FIGS. 2(A) and 2(B) is another cross-sectional diagram for showing the embodiment of the gate valve apparatus.
Figure 2B:
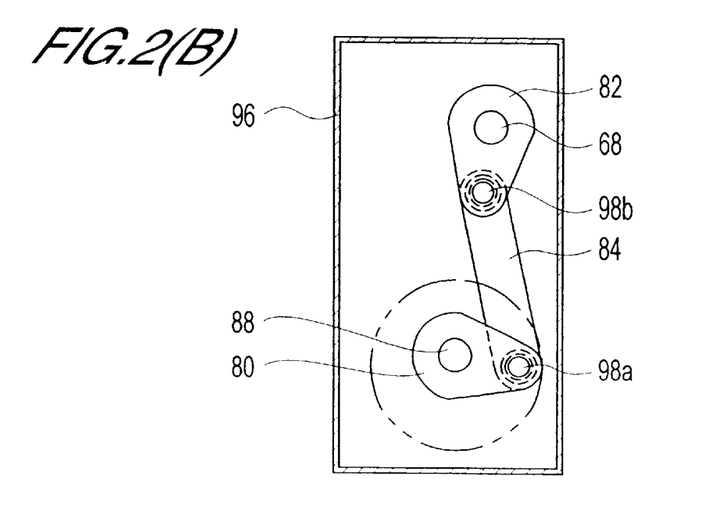
Figure 3A:
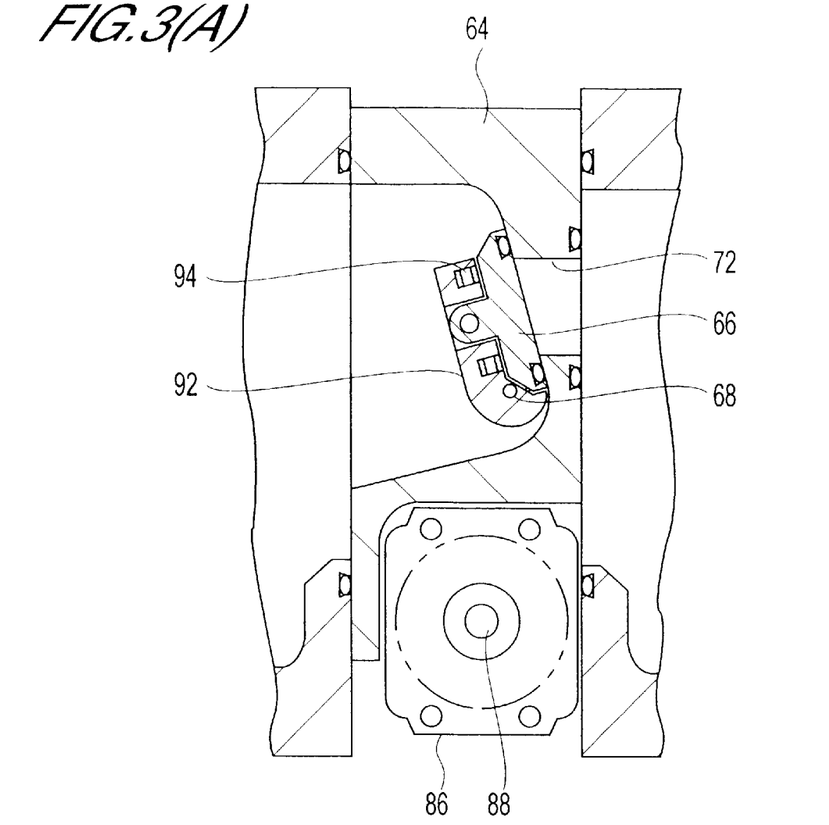
FIGS. 3(A) and 3(B) is another cross-sectional diagram for showing the embodiment of the gate valve apparatus.
Figure 3B:
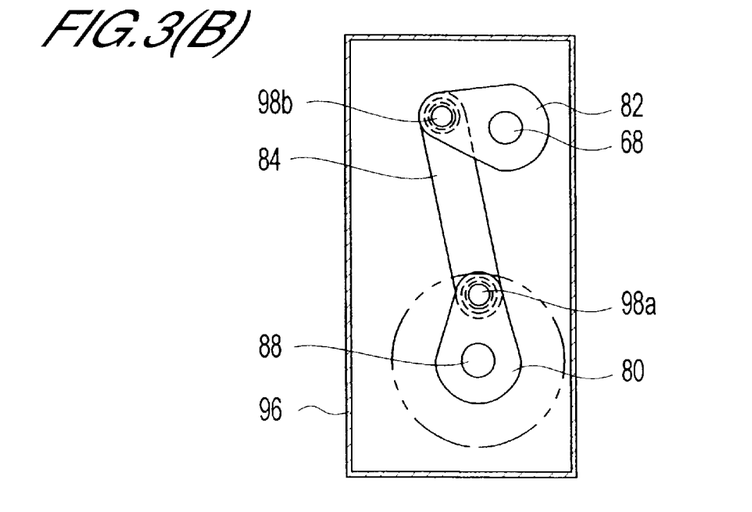

FIG. 1, FIG. 2 and FIG. 3 are cross-sectional views which show one embodiment of the configuration of the gate valve apparatus of the present invention. FIG. 1 is a diagram which shows the cross-section parallel to the valve seat of the gate valve apparatus. FIG. 2(A) and FIG. 3(A) are diagrams which show a cross-section orthogonal to the valve seat of the gate valve apparatus. FIG. 2(B) and FIG. 3(B) are diagrams which show a cross-section orthogonal to the drive shaft 68 of the open/close mechanism 70. FIGS. 1 and 2 show the state at the time of opening and FIG. 3 shows the state at the time of closing.

The gate valve apparatus comprises, principally, a valve box 64, valve 66, valve rod 68 and open/close mechanism 70. A flow path port 72 opens to the wall surface of the valve box 64. The valve 66, housed in the inner side of the valve box 64, is used to attain the opening and closing of the flow path port 72. A drive shaft 68, as a valve rod, is connected to the valve 66. The open/close mechanism 70 affords the operation of the drive shaft 68 in which it performs an open/close operation whereby, in the closing operating, the valve 66 is caused to be seated on the valve seat of the valve box 64, and in the opening operation the valve 66 is caused to separate from the valve seat.

The gate valve apparatus has a left/right symmetrical configuration with respect to the valve 66. By way of example, drive shafts 68 of the same shape are connected to both side parts of the valve 66. The rotational axis of these drive shafts 68 coincide. The drive shafts 68 lead out to the exterior by way of openings 74 which open to the side parts of the valve box 64. Guide units 76 are fixed in the side parts of the valve box 64, and the drive shafts 68 are supported with respect to the guide units 76 by bearings 78. The guide units 76 comprise a guide function for the drive shafts 68 and a seal unit function for separating the vacuum and atmosphere.

In this way, the valve 66 is provided in a state in which it is supported from both sides by the drive shafts 68. The drive shafts 68 are positioned below the flow path port 72. The drive shafts 68 are rotation-driven by open/close mechanisms 70 of respectively the same configuration. When the open/close mechanisms 70 are caused to operate, the drive shafts 68 are rotated at the same speed in the same direction, so the valve 66 can perform the swinging motion with the drive shafts 68 as its axis.

Each of the above-described open/close mechanisms 70 is connected to one end part of each of the drive shafts 68. The valve 66 is connected to the other end parts of the drive shafts 68. The open/close mechanisms 70 form a link configuration comprising only a turning pair. The open/close mechanism 70 are configured from a first swing link 80, a second swing link 82 and a coupling link 84. The open/close mechanisms 70 are configured from a first swing link 80, a second swing link 82 and a coupling link 84. The first swing link 80 is driven by a rotation cylinder 86 to work as a drive joint. The first swing link 80 is a link which performs a swinging motion. The second swing link 82, which is connected to the drive shaft 68, is a link which performs a swinging motion with a drive shaft 68 as an axis. The coupling link 84 is a link which couples the first swing link 80 and the second swing link 82. The first swing link 80 and one end of the coupling link 84 are connected to have freedom to rotate around a shaft 98b. By virtue of this, the shaft 98a and first swing link 80, the shaft 98a and coupling link 84, the shaft 98b and second swing link 82, and the shaft 98b and coupling link 84 each constitute turning pairs.

Since the open/close mechanism is configured as mentioned above, when the rotation cylinder 86 is driven whereby the first swing link 80 is caused to swing, the coupling link 84 is vertically driven in accordance therewith, and the second swing link 82 is caused to swing. Accordingly, the valve 66 attached to the second swing link 82 swings and the open/close operation of the flow path port 72 is performed. The open/close mechanism 70 is housed in the inner part of the case 96 whereby it is protected.

The above-noted rotation cylinder 86 causes inner blade parts to rotate by the supply of air, thereby to cause a rotation shaft 88 connected to these blades to rotate. The air supply locations are prepared in two places, and when air is introduced from either supply location the rotation shaft 88 can be rotated in a predetermined direction. The rotation cylinder 86 is fixed to a concave part formed in the lower part of the valve box 64. The rotation shaft 88 of the rotation cylinder 86 extends in the same direction as the rotational axis of the drive shaft 68. The above-noted first swing link 80 is connected to the end part of the rotation shaft 88.

Furthermore, the connection section of the valve 66 and drive shafts 68 is configured as shown in detail in FIG. 2(A) and FIG. 3(A). Specifically, the drive shafts 68 are connected to the valve 66 by way of rotation plates 92. The valve 66 is axially-supported, taking the axis of the same direction as the rotational axis of the drive shafts 68 with respect to the rotation plates 92 as the fulcrum, in such a way that a slight swing is permitted. In addition, springs 94 are inserted between the valve 66 and rotation plates 92. By virtue of such a configuration, the movement of the valve 66 is stabilized during the open/close operation.

Figure 4:
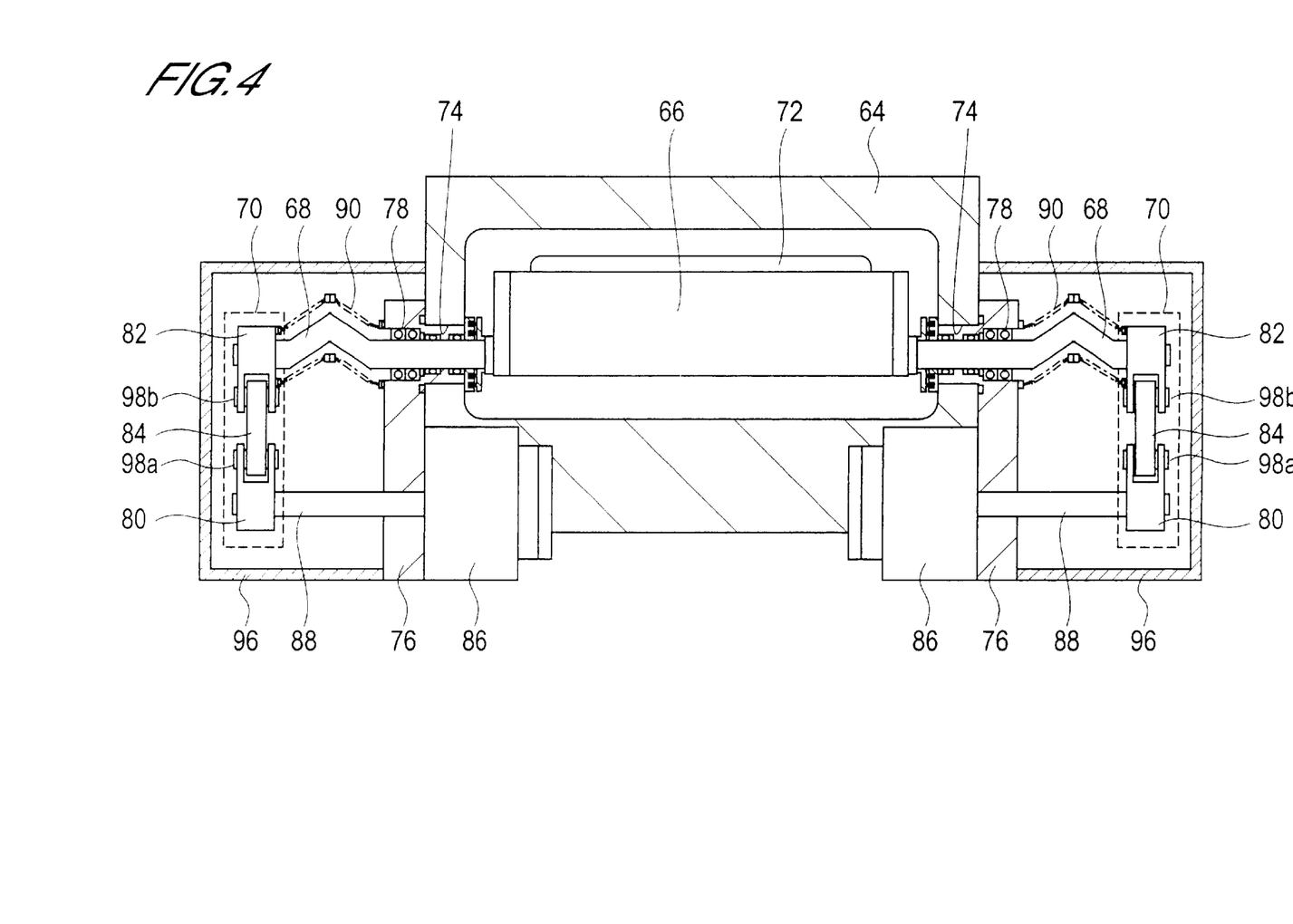
FIG. 4 is a cross-sectional diagram for showing another embodiment of the configuration of a gate valve apparatus according to the present invention in which a rotation-correspondent bellows is employed.

In addition, FIG. 4 is a cross-sectional view which shows the configuration in which the rotation-correspondent bellows are employed. In this case, drive shafts 68 in which the center thereof is a "<"-shaped or knee-shaped bent section are employed. However, the center axis of the section (non-bending section) which extends parallel with the rotation axis of the drive shafts 68 is coincident with this rotational axis. The guide units 76 and the second swing link 82 are connected by the rotation-correspondent bellows 90 which comprises two directly connected bellows. The bent section of the drive shafts 68 described above are housed in the rotation-correspondent bellows 90. Based on such a configuration, the pressure state within the valve box 64 can be maintained and the buckling of the bellows which is liable to occur when the drive shafts 68 are over-rotated can be prevented. It will be noted that, when the drive shafts 68 are not formed in a bent structure, the drive shafts 68 become comparatively long, and the buckling can be prevented from occurring when bellows of an appropriate length are employed.

Next, a description will be given to the closing operation of the gate valve. First, in the open state as shown in FIG. 2, the rotation cylinder 86 is driven and the first swing link 80 is caused to rotate in the anticlockwise direction in the drawing of FIG. 2(B) about the rotation shaft 88. Then, the coupling link 84 is pushed upward, by which the second swing link 82 is rotated clockwise. Accordingly, clockwise rotational forces are imparted to the drive shaft 68 provided in the rotational center of the second swing link 82. According to the rotational movement of the drive shaft 68, the valve 66 is rotated to the flow path port 72, and the surface of the valve 66 in which an O-ring is provided is caused to be seated on the valve seat as shown in FIG. 3(A).

Next, a description will be given to the opening operation of the gate valve. First, in the closing state as shown in FIG. 3, the rotation cylinder 86 is driven and the first swing link 80 is caused to rotate in the clockwise direction in the drawing of FIG. 3(B) about the rotation shaft 88. Then, the coupling link 84 is pulled downward, by which the second swing link 82 is rotated anticlockwise. Accordingly, anticlockwise rotational forces are imparted to the drive shaft 68 provided in the rotational center of the second swing link 82. According to the rotational movement of the drive shaft 68, the valve 66 is rotated in the direction away from the side of the flow path port 72, and the flow path port 72 forms the opened state as shown in FIG. 2(A).

As is described above, in this embodiment of the present invention, a rotation cylinder 86 is employed as the drive source and the open/close mechanism 70 of the gate valve apparatus comprises only a turning pair. Because the open/close mechanism 70 can be provided in the side part of the valve box 64, the size of the drive part for the gate valve apparatus is determined from the size in the diametrical direction of the rotation cylinder 86 only. In addition, the rotation cylinder 86 can be housed in a concave part formed below the valve box 64. Accordingly, a reduction in size of the drive part of the gate valve apparatus is possible, and the ensuring of maintenance space is made easy. By virtue of this, a light weight and a reduction in the manufacturing cost of the gate valve apparatus is possible.

In addition, because the direction of operation of the valve 66 is in one direction only, reliability and stability are improved by comparison with the prior art. Furthermore, by the arrangement of the contact surface of the principally solid bodies on the atmospheric side, a lowering of particles is achieved.

It will be noted that a configuration may be adopted in which the drive shaft 68 is directly connected to the rotation cylinder 86 to effect direct drive of the drive shaft 68. In such a configuration, however, the torque imparted to the valve 66 and the generated torque of the rotation cylinder 86 are equalized. Accordingly, in order to generate torque which is able to resist the inverted pressure when the valve is closed, a large-scale rotation cylinder 86 must be used.

Figure 5:
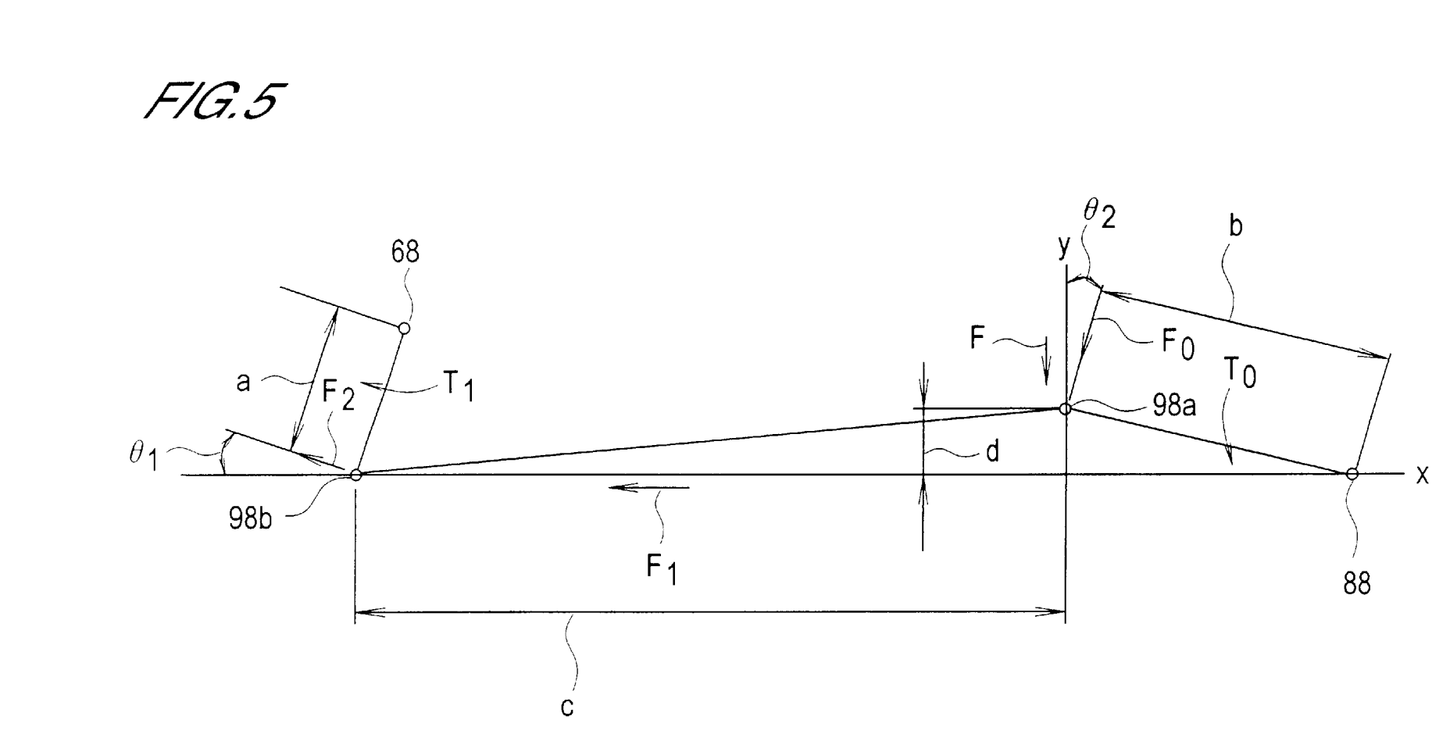
FIG. 5 is a diagram for explaining the generated torque of the open/close mechanism.

In contrast to this, when the open/close mechanism 70 as described in this embodiment of the present invention is employed, the torque imparted to the valve 66 is n-times the generated torque of the rotation cylinder 86 (n is a number determined by the link of the open/close mechanism 70). As a result, the generated torque of the rotation cylinder 86 is simply 1/n compared to a case using the above-mentioned direct connection type drive shaft. Accordingly, a reduction in size of the rotation cylinder 86 is possible. With reference to FIG. 5, a description of the method for calculating the value of n will hereinbelow be given.

FIG. 5 is a diagram for explaining the generated torque of the open/close mechanism 70. In FIG. 5 an x-axis and y-axis are set in the horizontal direction and vertical direction, respectively. The rotation center of the rotation shaft 88 and rotation center of the shaft 98b are located on the x-axis, respectively. The distance between the rotation center of the shaft 98b and the rotation center of the drive shaft 68 is shown by the reference symbol "a". In addition, the distance between the rotation center of the rotation shaft 88 and rotation center of the shaft 98a is shown by the reference symbol "b". Furthermore, the distance along the x-axis direction between the rotation center of the shaft 98a and the rotation center of the shaft 98b is shown by the reference symbol "c". Furthermore, the distance between the rotation center of the shaft 98a and the x-axis is shown by the reference symbol "d".

$T_0$ is taken as the torque imparted by the rotation cylinder 86 on the rotation shaft 88. This torque $T_0$ generates a force $F_0$ toward the rotation direction of the shaft 98a. This force $F_0$ is expressed by the formula (1) below.

$$F_0 = b \times T_0 \tag{1}$$

The component F of the force $F_0$ which is projected in the y axis direction is expressed by the formula (2) below.

$$F = F_0 \cos\theta_2 \tag{2}$$

Where, the symbol $\theta_2$ expresses the angle formed between the y-axis and the direction in which the force of the $F_0$ has action.

The shaft 98a is moved in the y-axis direction by the force F, and it is moved in the x-axis direction by a force $F_1$. It is generally known that, in the open/close mechanism 70 referred to as a toggle link, F and $F_1$ have a relationship based on the formula (3) below.

$$F_1 = c \cdot F / (2d) \tag{3}$$

In addition, the shaft 98b, which is push-pressured in a predetermined direction by a force $F_2$, is rotated with respect to the rotation center of the drive shaft 68. The angle formed between the x-axis and the direction in which the force of the $F_2$ has action is expressed by the symbol $\theta_1$. At this time, the force $F_2$ is expressed by the formula (4) below.

$$F_2 = F_1 \cos\theta_1 \tag{4}$$

Accordingly, the torque $T_1$ imparted to the shaft 98b is expressed by the formula (5) below based on the formulae (1) to (4).

$$T_1 = a \times F_2 = ac \cdot \cos\theta_1 \cdot \cos\theta_2 \cdot T_0 / (2bd) \tag{5}$$

As a result, the above-noted n ($=T_1/T_0$) is expressed by the formula (6) below.

$$n = ac \cdot \cos\theta_1 \cdot \cos\theta_2 / (2bd) \tag{6}$$

Based on the configuration of the embodiment of the present invention, the fact that the value of n can be designed to be in the order of 7 while a reduction in size of the open/close mechanism 70 is being achieved is assured.

Based on the gate valve of this invention, the opening and closing of the flow path port is performed by the swing motion of the valve using the valve rod as an axis. In addition, the open/close mechanism which operates the valve rod is configured from only a turning pair. A link mechanism which is configured from only a turning pair such as this is able to, even if it is small-scale, generate a comparatively large force. Accordingly, a gate valve of smaller size than the prior art can be provided, and the securing of maintenance space is made easy. The reduced space gate valve of the present invention is effective in the large apertures of substrates in which hereafter progress will continue to be made.

What is claimed is:

1. A gate valve apparatus which comprises:
   a valve box with a flow path port;
   a valve housed in the inner side of the said valve box which is employed in the opening and closing of said flow path port;
   a valve rod connected to said valve; and
   an open/close mechanism having a link mechanism which includes only a turning pair;
   said link mechanism being connected to said valve rod for performing rotation thereof around its center axis to cause said valve to to swing in from the front of the valve seat to a closing position where said valve is seated on the valve seat of said valve box and to swing out from the front of the valve seat to an opening position where said valve is separated from said valve seat.

2. A gate valve apparatus according to claim 1, wherein said link mechanism includes, as a drive joint, a link which performs a swinging motion.

3. A gate valve apparatus according to claim 1, wherein said link mechanism includes:
   a first swing link as a drive joint form performing a swinging motion;
   a second swing link connected to said valve rod which performs a swinging motion with said valve rod as its axis; and
   a coupling link which couples said first and second swing links.

4. A gate valve apparatus according to claim 3, further comprising a rotation cylinder coupled through a rotation shaft to said first swing link of said link mechanism.

5. A gate valve apparatus according to claim 3, wherein said link mechanism further comprises a first shaft and second shaft;
   said first swing link and an end of said coupling link being rotatably connected to said first shaft;
   said second swing link and another end of said coupling link being rotatably connected to said second shaft; and
   said first and second swing link, said first shaft and said second shaft and said coupling link constitute said turning pair.

6. A gate valve apparatus according to claim 1, further comprising a rotation cylinder coupled through a rotation shaft to said link mechanism for causing said rotation of said valve rod.

7. A gate valve apparatus which comprises:
   a valve box with a flow path port;
   a valve housed in the inner side of said valve box which is employed in the opening and closing of said flow path port;
   a valve rod connected to said valve; and
   an open/close mechanism which affords the operation of said valve rod in that it performs a closing operation, whereby said valve is caused to be seated on the valve seat of said valve box, and an opening operation, whereby said valve is caused to be separated from said valve seat, said open/close mechanism comprises, as a drive joint, a link which performs a swinging motion,
   wherein said valve is configured so as to have a swinging motion with said valve rod as its axis, and said open/close mechanism is a link mechanism configured from a turning pair only.

8. A gate valve apparatus which comprises:
   a valve box with a flow path port;
   a valve housed in the inner side of said valve box which is employed in the opening and closing of said flow path port;
   a valve rod connected to said valve; and
   an open/close mechanism which affords the operation of said valve rod in that it performs a closing operation, whereby said valve is caused to be seated on the valve seat of said valve box, and an opening operation, whereby said valve is caused to be separated from said valve seat, said open/close mechanism comprises:
   a first swing link as a drive joint for performing a swinging motion;
   a second swing link connected to said valve rod which performs a swinging motion with said valve rod as its axis; and
   a coupling link which couples said first and second swing links,
   wherein said valve is configured so as to have a swinging motion with said valve rod as its axis, and said open/close mechanism is a link mechanism configured from a turning pair only.

* * * * *